C. O. PAUL.
TRACTOR.
APPLICATION FILED JULY 3, 1914.
1,153,109.
Patented Sept. 7, 1915.
2 SHEETS—SHEET 1.
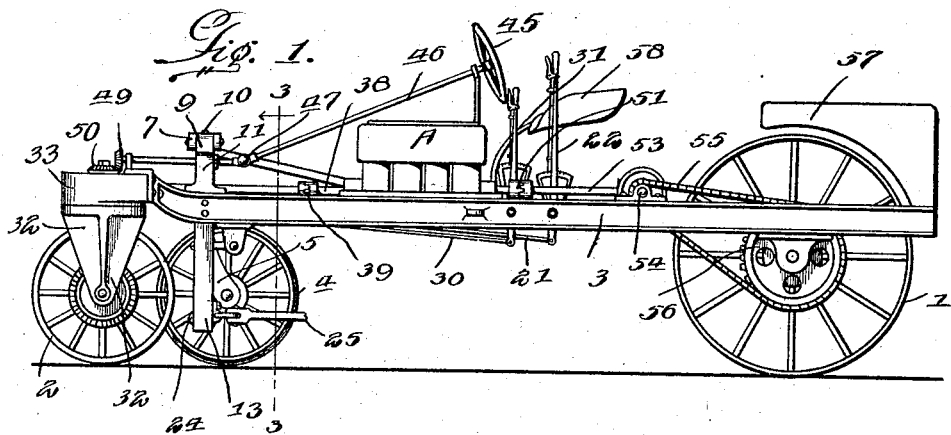
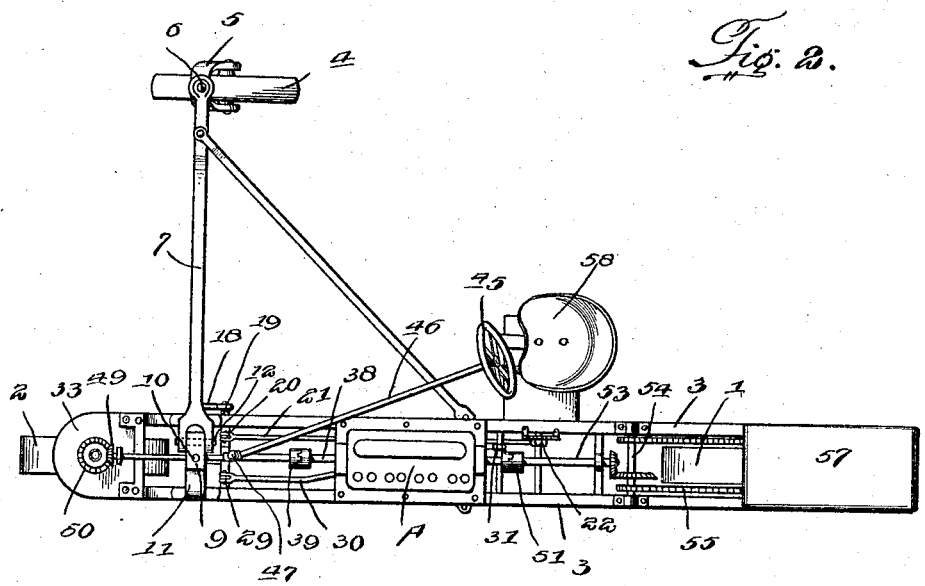
Witnesses
Frederick L. Fox.
R. M. Smith.
Inventor
Charles O. Paul.
By Victor J. Evans
Attorney C. O. PAUL.
TRACTOR.
APPLICATION FILED JULY 3, 1914.
1,153,109.
Patented Sept. 7, 1915.
2 SHEETS—SHEET 2.
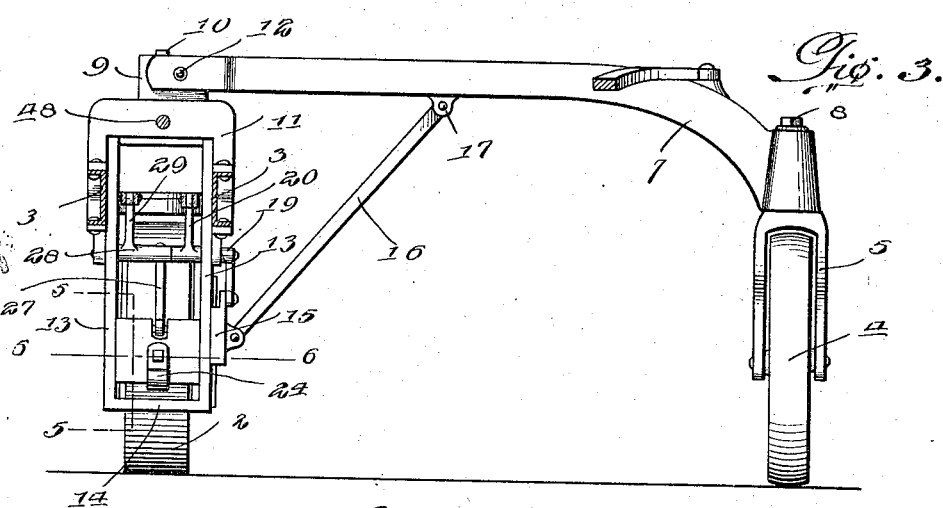
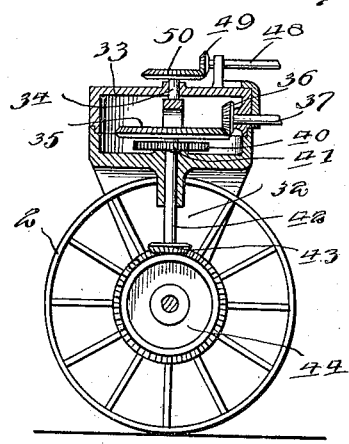
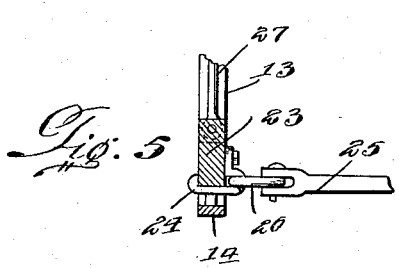
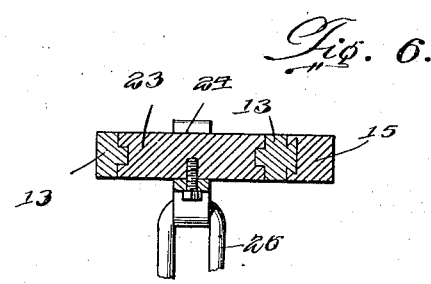
Witnesses
Frederick L. Fox.
P. M. Smith.
Inventor
Charles O. Paul.
By Victor J. Evans.
Attorney

UNITED STATES PATENT OFFICE.

CHARLES O. PAUL, OF KENT, WASHINGTON.

TRACTOR.

1,153,109.  Specification of Letters Patent.  Patented Sept. 7, 1915.

Application filed July 3, 1914. Serial No. 848,927.

*To all whom it may concern:*

Be it known that I, CHARLES O. PAUL, a citizen of the United States, residing at Kent, in the county of King and State of Washington, have invented new and useful Improvements in Tractors, of which the following is a specification.

This invention relates to tractors, the object of the invention being to provide a simple, cheap and practical farm tractor especially designed for use on small farms and in orchards and the like, to take the place of the usual team of draft animals and to perform the work more efficiently and economically, the construction hereinabove described enabling the tractor and the farming implement drawn thereby to be operated in closer proximity to fences and trees and to approach the same more closely in a head on direction as well as laterally.

A further object of the invention is to provide simple and effective means whereby the machine may be steered and turned in its own length and whereby the hitching point of a plow or other farming implement may be adjusted up and down to obtain the best results.

With the above and other objects in view, the invention consists in the novel construction, combination and arrangement of parts, as will hereinafter be more fully described, illustrated and claimed.

In the accompanying drawings:—Figure 1 is a side elevation of a farm tractor embodying the present invention. Fig. 2 is a plan view of the same. Fig. 3 is a vertical cross section taken just in rear of the yoke and looking in a forward direction. Fig. 4 is a detail section through the mechanism of the front steering and traction wheel, showing the driving and steering mechanism. Fig. 5 is a detail section on the line 5—5 of Fig. 3. Fig. 6 is a detail section on the line 6—6 of Fig. 3.

Referring to the drawings 1 designates the main traction wheel located at the rear of the machine, and 2 the front traction and steering wheel located at the opposite end of the frame. Only one rear and one front wheel is employed as clearly shown in the plan view, Fig. 2, this being done in order to enable an unusually narrow machine frame to be employed, the said machine frame embodying the two parallel side bars 3 each preferably formed of channel iron as indicated in the cross sectional view, Fig. 3, and said side bars being connected at suitable intervals in rigid relation to each other. These side bars 3 are arranged as close together as practicable and ordinarily will only be spaced apart a sufficient distance to receive between them the rear traction wheel 1 as clearly shown in Fig. 2, together with any necessary driving elements for imparting motion to said rear driving wheel.

Located at one side of the machine frame is a lateral stabilizing wheel 4 which is mounted in a fork 5 the stem 6 of which passes through a vertical opening in the outer end of a yoke 7, the stem 6 being fastened by means of a clamping nut 8 which prevents the fork 5 from turning. The yoke 7 is connected at its inner end with the machine frame by means of a universal joint which is illustrated as comprising a head piece 9 mounted to turn on a vertical pivot 10 extending upwardly from the top of a guide frame 11 hereinafter more particularly described, the yoke 7 being directly connected to the head piece 9 by means of a horizontal pivot 12. This forms a universal joint between the yoke 7 and the machine frame which enables said yoke to be swung around so that it may be disposed at either side of the main frame of the machine to accommodate right and left hand plows and the like.

The guide frame 11, as shown in Fig. 3, is of open rectangular form comprising parallel vertical side bars 13 which are fastened rigidly to the side bars 3 of the machine frame and connected at the bottom by a cross bar 14. Mounted slidingly on one of the cross bars 13 is a vertically movable runner 15 to which is pivotally connected one end of a brace 16 the opposite end of which is pivotally connected at 17 to the yoke 7 at a point intermediate the ends of said yoke as clearly shown in Fig. 3. Attached to the slidable runner 15 is a crank arm 18 on one end of a shaft 19 extending transversely of the machine frame, said shaft being provided with another arm 20 from which a connecting rod 21 extends back to a manually controlled lever 22. Thus the operator while in his seat on the machine may raise and lower the runner 15 and correspondingly vary the angle of the yoke 7 so as to give any desired list to the machine frame and the front and rear wheels 1 and 2.

Slidably mounted between the frame bars 13 is a draw bar 23 which carries a clip or clevis 24 to which the tongue or beam 25 of a plow or other farming implement may be attached as shown in the detail view, Fig. 5, by means of a link 26 or any other mechanical device. The member 23 is raised and lowered by a crank arm 27 on another shaft 28 concentric with the shaft 19 above described and also provided with another arm 29 from which a connecting rod 30 leads back to a hand lever 31 within convenient reach of the operator. The operator while in his seat on the machine may thus raise and lower the clevis 24 and may also adjust the angle of the yoke 7 to vary the lateral inclination of the main frame and also to adapt the machine to work on hillsides.

The front steering and traction wheel 2 is mounted in a fork 32 which is mounted to turn on a vertical axis for steering purposes. The fork 32 is mounted under a cylindrical head 33 in which is journaled a shaft 34 concentric with the axis of turning movement of the fork 32, said shaft 34 having fast thereon a bevel gear wheel 35 which is driven by a pinion 36 on the forward section 37 of a central longitudinal shaft which is driven by the shaft 38 of an internal combustion motor conventionally illustrated at A. The shafts 37 and 38 are connected by a shiftable clutch 39 which is normally held open so that the front wheel 2 is not driven under ordinary conditions. On the same shaft 34 with the wheel 35 is a spur gear wheel 40 which drives a similar wheel 41 on a countershaft 42 having fast thereon a bevel pinion 43 meshing with a bevel gear wheel 44 on the hub of the front wheel 2. The mechanism just hereinabove described provides for driving the wheel 2 in addition to the wheel 1.

The front wheel is turned for steering purposes by means of a hand controlled wheel 45 on the rear end of a steering shaft 46 connected by a universal joint 47 to another forward section 48 of the same shaft, the shaft section 48 being provided with a pinion 49 which meshes with a gear wheel 50 having a fixed relation to the fork 32. The engine shaft is connected by a clutch 51 to a rear shaft section 53 which is in turn geared to a cross shaft 54 from which one or more chains 55 extend around one or more sprocket wheels 56 having a fixed relation to the rear traction wheel 1.

57 designates the gasolene tank and 58 the driver's seat.

From the foregoing description taken in connection with the accompanying drawings it will be seen that I have produced a very simple and cheaply constructed tractor especially adapted for farm purposes in the way above indicated and that by reason of the narrow frame of the machine, the tractor may be driven laterally or head on in very close proximity to fences, trees, barns and other obstructions. It will further be understood that the tractor is adapted equally well to both right and left hand plows and other farming implements by reason of the fact that the lateral stability wheel may be arranged at either side of the main frame by reason of the reversibility of the yoke 7. Furthermore, the machine is admirably adapted to hillside work by reason of the pivotal mounting of the yoke and the adjusting mechanism used in connection therewith.

What I claim is:—

1. A tractor comprising a single rear traction wheel, a single front traction and steering wheel in line with said rear wheel, a machine frame embodying parallel side bars arranged in close proximity to the plane of movement of said wheels and at opposite sides thereof, steering and motor driving mechanism for said wheels, a side stabilizing wheel located outside of said frame, a laterally extending yoke having a universal joint connected with the machine frame and terminally supported by said stabilizing wheel, and a brace interposed between said yoke and the machine frame.

2. A tractor comprising a single rear traction wheel, a single front traction and steering wheel in line with said rear wheel, a machine frame embodying parallel side bars arranged in close proximity to the plane of movement of said wheels and at opposite sides thereof, steering and motor driving mechanism for said wheels, a side stabilizing wheel located outside of said frame, a laterally extending yoke having a universal joint connected with the machine frame and terminally supported by said stabilizing wheel, and a brace interposed between said yoke and the machine frame, said yoke being reversible by means of said universal joint so that it may be disposed at either side of the machine frame.

3. A tractor comprising a single rear traction wheel, a single front traction and steering wheel in line with said rear wheel, a machine frame embodying parallel side bars arranged in close proximity to the plane of movement of said wheels and at opposite sides thereof, steering and motor driving mechanism for said wheels, a side stabilizing wheel located outside of said frame, a laterally extending yoke having a universal joint connected with the machine frame and terminally supported by said stabilizing wheel, a brace interposed between said yoke and the machine frame, and means under control of the operator on the machine for adjusting one end of said brace to change the angle of the latter.

4. A tractor comprising a single rear traction wheel, a single front traction and steering wheel in line with said rear wheel, a machine frame embodying parallel side bars arranged in close proximity to the plane of movement of said wheels and at opposite sides thereof, steering and motor driving mechanism for said wheels, a side stabilizing wheel located outside of said frame, a vertically arranged guide extending downwardly below the machine frame in rear of said front wheel, a clevis slidable up and down on said guide, and means under the control of the driver for raising and lowering said clevis.

In testimony whereof I affix my signature in presence of two witnesses.

CHARLES O. PAUL.

Witnesses:
F. C. ALLFIELD,
J. J. BISSELL.

Copies of this patent may be obtained for five cents each, by addressing the "Commissioner of Patents, Washington, D. C."